United States Patent [19]

Kocot

[11] 4,456,916

[45] Jun. 26, 1984

[54] INK JET CARTRIDGE WITH HYDROSTATIC CONTROLLER

[75] Inventor: Raymond H. Kocot, Danbury, Conn.

[73] Assignee: Burroughs Corporation, Detroit, Mich.

[21] Appl. No.: 425,232

[22] Filed: Sep. 28, 1982

[51] Int. Cl.³ .................. G01D 15/16

[52] U.S. Cl. .................. 346/140 R

[58] Field of Search .................. 346/140 R, 140 A, 75

[56] References Cited

U.S. PATENT DOCUMENTS 4,282,536 8/1981 Paschen .................. 346/140

4,319,254 3/1982 Hurkmans .................. 346/140

4,404,573 9/1983 Kocot .................. 346/140

*Primary Examiner*—Joseph W. Hartary

*Attorney, Agent, or Firm*—Mark T. Starr; E. M. Chung; K. R. Peterson

[57] ABSTRACT

A disposable electrostatic ink jet cartridge forms part of a printer head which is mounted to move transversely back and forth across the width of a recording paper. The cartridge includes an ink jet nozzle and multicompartment ink reservoir, one compartment supplying the ink jet nozzle with ink. As printing occurs, the head height of ink supplying the ink jet nozzle decreases. In order to restore proper height height, as the head moves in one direction, an external fixed cam engages a leaf spring connected to the cartridge, causing a connected float to displace ink contained in the other reservoir compartment. The displaced ink is forced over a dividing wall in the reservoir into the compartment on the front of which is mounted the ink jet nozzle. As the head reverses direction, the cam is disengaged from the leaf spring, thus restoring the float to a raised position. The ink in the compartment to which the nozzle is mounted is blocked from flowing back into the other compartment by the dividing wall, thereby leaving the head height of the ink supplying the ink jet nozzle at a level corresponding to optimum hydrostatic pressure for proper operation.

19 Claims, 5 Drawing Figures

INK JET CARTRIDGE WITH HYDROSTATIC CONTROLLER

CROSS-REFERENCE TO RELATED APPLICATIONS

Reference is made to a copending application entitled "Ramp Style Constant Head Ink Jet Cartridge", Ser. No. 425,233, filed concurrently with the present application by the same inventor, said application being assigned to the same assignee as the present application. That application discloses a simpler ink jet cartridge which also provides constant hydrostatic pressure to an ink jet nozzle.

Reference is also made to U.S. Pat. No. 4,404,573 for "An Electrostatic Ink Jet System", filed Dec. 28, 1981 and assigned to the same assignee as the present application. That application is incorporated herein to show the operation of an electrostatic ink jet printing system such as that utilized in the present invention.

BACKGROUND OF THE INVENTION

1. Field of the Invention

The present invention relates in general to the field of electrostatic ink jet printers. More particularly, the present invention relates to a disposable ink jet cartridge which forms part of a printer head which is mounted to move transversely back and forth across the width of a recording paper. Still more particularly, the present invention relates to an ink jet printer in which a replaceable cartridge contains not only the ink supply but also the ink jet itself.

2. Prior Art

Prior art electrostatic ink jet printing systems include an ink jet nozzle, a supply of conductive ink, a metallized surface upon which recording paper is placed, and a high voltage supply connected between the conductive ink and the metallized surface. Upon application of the voltage differential, the ink is drawn from the ink jet nozzle toward the metallized surface. Since the paper is interposed between the ink jet nozzle and the metallized surface, the ink is deposited on the paper so long as the voltage is applied. Thus, either the paper, the ink jet nozzle, or both have to be moved in order to print any comprehensible information.

Many problems exist in prior art electrostatic ink jet printing systems. For example, since the reservoir containing the ink supply has to be periodically refilled, the reservoir must include an opening means for adding additional ink. Oftentimes, during refilling, outside contaminents enter the opening along with the ink. Also, the container for storing the refill supply of ink may include dried ink residue which can be introduced to the system when the reservoir is refilled. The introduction of such contaminents to the ink supply reservoir often results in clogging of the ink jet nozzle. Further, the task of refilling the ink reservoir is a messy job.

Prior art systems exhibit additional problems due to variations in the level of ink in the supply reservoir. These variations cause changes in the ink head pressure to the jet nozzle and result in variations in the density and quality of the printing produced.

3. Objects

It is the general object of the present invention to overcome many of the above mentioned drawbacks of the prior art by providing a disposable ink jet cartridge which contains therein not only an ink supply, but also the jet nozzle itself.

It is another object of the present invention to provide such a cartridge whose internal head pressure at the jet nozzle is maintained at a constant level by a hydrostatic controller.

It is still another object of the present invention to provide an ink cartridge which includes means for transferring an enclosed ink supply from one compartment over a fixed height wall into another compartment to thereby maintain a constant head pressure in the other compartment.

It is an additional object of the present invention to provide an ink jet cartridge whose ink supply is sealed from contamination by external particulants.

It is still an additional object of the present invention to provide an ink jet cartridge which maintains constant hydrostatic pressure to an integral nozzle and which automatically vents the ink supply to allow air to replace expended ink.

It is yet another object of the present invention to provide an ink jet cartridge which forms part of a printer head which is mounted to move transversely back and forth across the width of a recording paper.

It is a further object of the present invention to provide a multi-compartmentalized ink jet cartridge including an integral electrostatic on-demand ink jet nozzle wherein a constant head pressure of ink is maintained in the compartment which supplies the jet nozzle with ink.

These and other objects of the present invention will become more apparent upon a studious consideration of the accompanying drawings in combination with a reading of the following detailed description of the preferred embodiments.

SUMMARY OF THE INVENTION

In accordance with the invention, a disposable ink jet cartridge forms part of the head of a printer mechanism. The head is mounted to move transversely back and forth across the width of a recording paper.

The cartridge includes a reservoir to contain the ink supply, the reservoir divided into two compartments by a fixed height wall. The first compartment supplies ink at a constant hydrostatic pressure to an on-demand ink jet nozzle which is mounted on the front wall of the first compartment, the dispensing tip of the nozzle facing the recording paper.

The second compartment contains an ink supply. A float contained in the second compartment has a rod attached to its top, the rod extending vertically upward and passing through a larger diameter hole in the top of the reservoir. A washer provided on the rod is in contact with the upper surface of the float. A leaf spring is connected between the top of the rod and a point on the top surface of the reservoir.

A cam is mounted on the printer mechanism to interact with the leaf spring when the head (and included cartridge) traverses across the paper in a first of its two directions of travel.

As the head moves in the first direction of travel, the leaf spring slidably engages the cam, thereby applying a downward force on the float. The float being depressed displaces the ink in the second compartment, forcing the ink over the wall and into the first compartment, the level of ink in the first compartment thereby being raised to a level at least equal to that of the wall.

When the head reverses direction, the cam is slidably disengaged from the leaf spring, thereby removing the downward force of the float. As the leaf spring reverts to its original position, it raises the float to its original level. Ink in the first compartment is trapped by the wall, thereby providing the ink jet nozzle with an ink head height providing optimal hydrostatic pressure for operation.

In addition to thus restoring optimum head height, as the float is pushed down, it displaces the washer, thereby venting the cartridge so that air replaces the volume of ink that had been dispensed from the ink jet nozzle since the previous priming occurred. With the float in its raised position, the reservoir is sealed by the washer thereby preventing contaminents from entering the reservoir.

In an alternate disclosed embodiment, the leaf spring is replaced by a bow-shaped spring under the float which raises the float after the downward force has been removed. In the alternate embodiment, the cam interacts directly with a modified rod to depress the float.

DETAILED DESCRIPTION OF THE PREFERRED EMBODIMENTS

Figure 1:
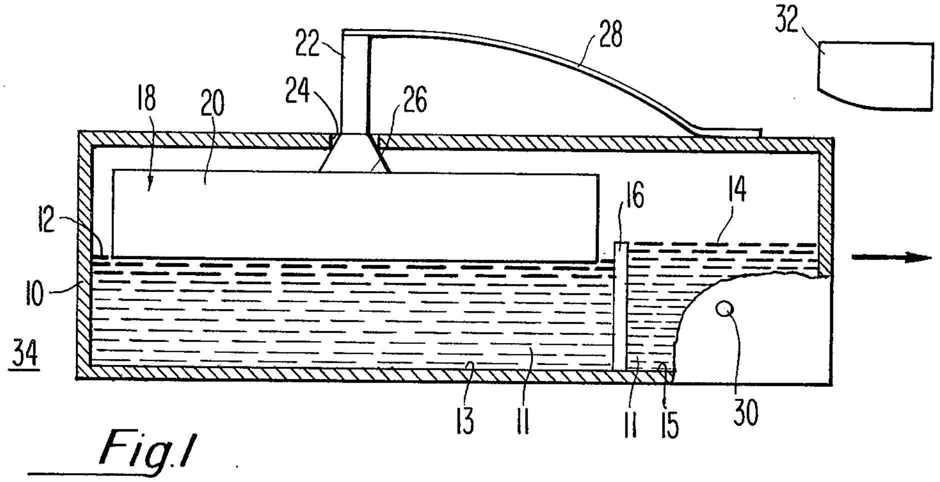
FIG. 1 is a front pictorial view of the disposable ink jet cartridge with a section cut away. Note that the external cam is fixedly mounted to a printer mechanism which is not shown.

Referring first to FIG. 1, shown is an ink reservoir 10 including a first portion 13 containing ink 11 at a first level 12 and a second portion 15 containing ink 11 at a second level 14, the first and second portions 13 and 15 separated by wall 16. A float member 18 made of plastic is installed in the ink reservoir 10 prior to assembling the ink reservoir 10. In the preferred embodiment, the float member 18 includes a hollow float shell 20 and rod 22 which is connected to the top outer surface of the shell 20. Those skilled in the art will appreciate that instead of being a hollow member, float shell 20 may alternatively be fabricated from a low density, solid material.

Figure 2:
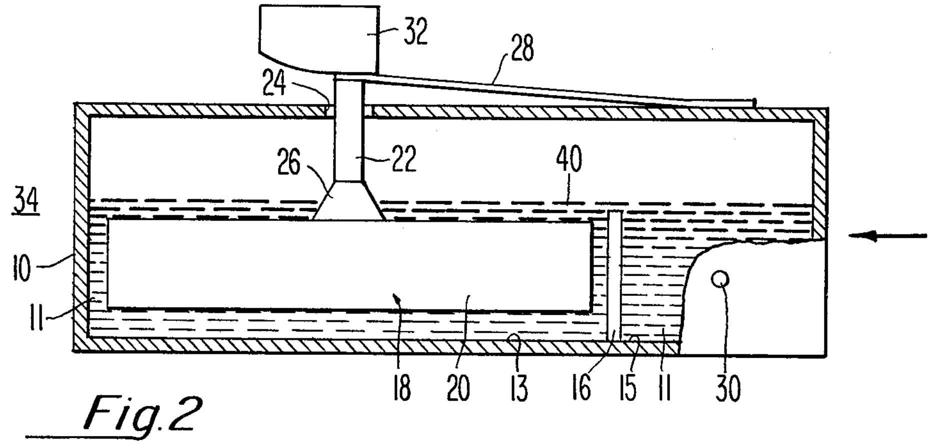
FIG. 2 is similar to FIG. 1, but shows the cartridge after the printer head has moved to the right, thereby engaging the leaf spring with the cam.
Figure 3:
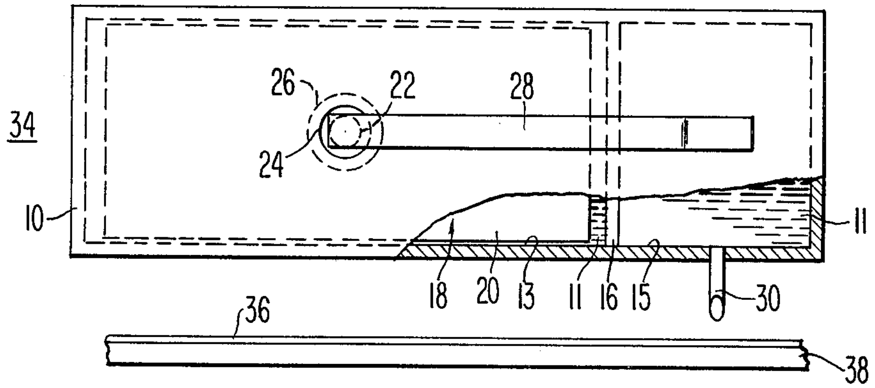
FIG. 3 is a top view of the cartridge of FIG. 1 with a section cut away.

The rod 22 is mounted perpendicularly with respect to the top outer surface of shell 20 and is connected to the shell 20 at the geometric center of the top surface of the shell 20. The rod 22 passes through hole 24 in the top surface of ink reservoir 10 as shown in FIGS. 2 and 3. Washer 26 is mounted on rod 22 with the bottom surface of washer 26 in contact with the upper surface of float shell 20. In the preferred embodiment, the washer 26 is made of a pliable plastic or rubber-like material so that it will create an air-tight seal when its surface contacts the edge surrounding hole 24. In the preferred embodiment, the washer 26 is held in position against the surface of float shell 20 due to the friction between the outer surface of rod 22 and the inner surface of washer 26 which exists due to the hole through washer 26 being of smaller diameter than the diameter of rod 22. Alternatively, an adhesive (not shown) may be used to keep the opposed surfaces of washer 26 and float shell 20 in contact.

A leaf spring 28 is connected between the top of rod 22 and the top surface of reservoir 10 as shown in FIG. 1.

Mounted perpendicularly to the front surface of reservoir 10 is ink jet nozzle 30. As shown in FIG. 3, the nozzle 30 is hollow so that the ink 11 may pass from the second portion 15 of reservoir 10 and be dispensed through the tip of the nozzle 30.

Cam 32 is mounted to the printer mechanism (not shown) and serves to depress the float member 18 as will be explained below.

The ink jet cartridge 34 of the present invention is intended to be disposable. Thus, when the ink supply 11 is exhausted, the entire cartridge 34 and integral nozzle 30 are replaced by removing the old cartridge 34 and installing a new cartridge in the print head mechanism (not shown). The cartridge 34 is intended for use in an electrostatic printing mechanism utilizing on-demand printing techniques well known in the prior art. In such an environment, ink 11 is only dispensed from nozzle 30 when the nozzle is pulsed with the appropriate voltage differential.

The printing mechanism which accommodates the cartridge 34 is of the type where the print head (including the integral cartridge 34) moves horizontally across the recording paper 36, one scan line at a time, and the ink jet 30 is activated only at points along the scan line where ink is to be deposited on paper 36. After the cartridge 34 has scanned across a line, the recording paper 36 is moved vertically to position the next scan line on the paper 36 in front of the dispensing aperture of the nozzle 30.

Printing may occur as the cartridge 34 scans across the paper 36 in either or both directions. In the case where printing occurs in both directions, the paper 36 must be vertically advanced at the completion of each scan in either direction.

Mechanisms for advancing the paper 36 in front of the nozzle 30 are well known in the prior art. For example, the paper 36 may be mounted on a drum which incrementally rotates at the completion of each scan line.

In the preferred embodiment, the paper 36 is positioned in front of a metallized surface 38 (FIG. 3). Those skilled in the art will appreciate the necessity of positioning the paper 36 in front of the metallized surface 38 in order to accomplish electrostatic ink jet printing.

Although not shown in the drawings, those skilled in the art will appreciate that a fixed potential or grounded control aperture may additionally be provided between the tip of ink jet 30 and the paper 36 in order to provide electrostatic shielding of the jet 30. The purpose of the control aperture is to eliminate the undesirable effects of triboelectric charging of the paper 36 and charges due to ink 11 already on the paper 36. In such case, it may be desirable to incorporate such a control aperture as part of the cartridge 34 itself, in which case it would also serve to protect the jet 30 from damage and the operator from injury from the pointed tip of the jet 30.

In the preferred embodiment, cam 32 is mounted on the printing mechanism (not shown) and is aligned with the cartridge 34 as shown in FIG. 1. Thus, when the head (and included cartridge 34) moves to the right, spring 28 comes into contact with the lower surface of fixed cam 32.

With the elements of the present invention thus defined, the operation of the present invention will now be explained with reference to FIGS. 1–3.

FIG. 1 shows the cartridge 34 after it has been primed (as will be explained below). In such a condition, the ink 11 in the second portion 15 of the reservoir 10 is at the second level 14, the second level 14 corresponding to the proper hydrostatic head pressure (and head height) to maintain a proper meniscus shape at the tip of the ink jet nozzle 30. The cartridge 34 is moved back and forth to the right and left by the printer head drive mechanism (not shown), and the jet 30 is pulsed at points along the travel where ink 11 is to be deposited on the paper 36. At the end of each head scan across the paper 36, the paper 36 is vertically repositioned to position the next scan line on the paper 36 in front of the jet 30.

As the ink 11 is dispensed from the nozzle 30, the level of ink 11 in the second portion 15 of the cartridge 34 gradually decreases from the initial second level 14 shown in FIG. 1. In the preferred embodiment, the level of ink in the second portion 15 remains sufficiently high to maintain adequate head pressure to accomplish the printing of an entire page before priming is required. After printing an entire page, the level of ink 11 in the second portion 15 of the cartridge 34 must be restored to the second level 14 in order to maintain proper head height and pressure for continued printing.

In the preferred embodiment, the head height is the vertical distance between the level of ink 11 in the second portion 15 and the center of the diameter of the longitudinal channel of ink jet nozzle 30. In a typical application, a head height of 0.2–0.3 inch is required for a jet 30 inside diameter of 0.024 inch in order to achieve an optimum meniscus at the external tip of nozzle 30. In the preferred embodiment, the second level 14 corresponds to the optimum head height of ink 11. Those skilled in the art will appreciate that factors such as the physical characteristics of the ink 11 and the geometry of nozzle 30 will affect the optimum head height and therefore influence the choice of the height of head height controlling wall 16.

After printing the last line on a page, the print head drive mechanism (not shown) moves the head (and included cartridge 34) to the right to engage leaf spring 28 against cam 32. FIG. 2 shows the cam 32 fully engaged with the leaf spring 28 after the extended head travel which occurs after completing the printing of each page.

As the cartridge 34 moves to the right, the upper surface of leaf spring 28 contacts the lower surface of fixed cam 32, thereby depressing the left hand end of leaf spring 28. As the leaf spring 28 is depressed, the downward force is transferred via connected rod 22, thereby pushing down connected float shell 20. The effect of pushing down float shell 20 is to displace the ink 11 in the first portion 13 of the cartridge 34 upward and over wall 16 into the second portion 15 of cartridge 34. Those skilled in the art will appreciate that assuming there is sufficient ink 11 in the first portion 13 of reservoir 10, when the float shell 20 is fully depressed as shown in FIG. 2, the level of ink 11 in the first and second portions 13, 15 of reservoir 10 will rise to a third level 40 which exceeds the height of wall 16.

As the cartridge 34 moves to the left from its position as shown in FIG. 2, the cam 32 is disengaged from leaf spring 28 and the leaf spring 28 and connected float member 18 are restored to the positions shown in FIG. 1. As this occurs, the ink 11 in the second portion 15 of reservoir 10 flows back into the first portion 13 of the reservoir 10 until the level of ink 11 in the second portion 15 of the reservoir 10 is at the same height as the top of wall 16. Of course, the wall 16 prevents the ink 11 level in the second portion 15 of the reservoir 10 from falling below the top of the wall 16.

Thus, by the action of the cam 32 causing the depression of float shell 20, the head pressure on the nozzle 30 has been restored to its optimal value.

In addition to reestablishing optimum head pressure, the downward movement of float member 18 simultaneously disengages washer 26 from hole 24. This venting action allows air to replace the volume of ink that has been dispensed through the ink jet nozzle 30, this venting being necessary to avoid creating a vacuum in the reservoir 10 which would prevent the proper dispensing of ink 11 from the nozzle 30.

In the preferred embodiment, when the cartridge 34 is not being primed, washer 26 serves to completely seal the reservoir 10, thereby preventing contaminents from entering the ink 11 supply. However, it should be noted that depending on the physical characteristics of the jet 30 and the ink 11, improved printing performance may be achieved by providing continuous partial venting of the reservoir 10. To accomplish continuous partial venting, rod 22 may be keyed such that when the cartridge 34 is inserted in the print head, rod 22 is held in a slightly depressed position by means (not shown) included in the print head, thereby providing a slight vent between the hole 24 and washer 26. In such case, further depression of rod 22 when spring 28 engages cam 32 will increase the amount of venting. Of course, when the cartridge 34 is not installed in the print head, it is sealed against leakage since rod 22 is in the fully raised position.

As an alternative to achieve partial venting, leaf spring 28 may be formed to slightly depress rod 22 even when it is not engaged with cam 32.

Figure 4:
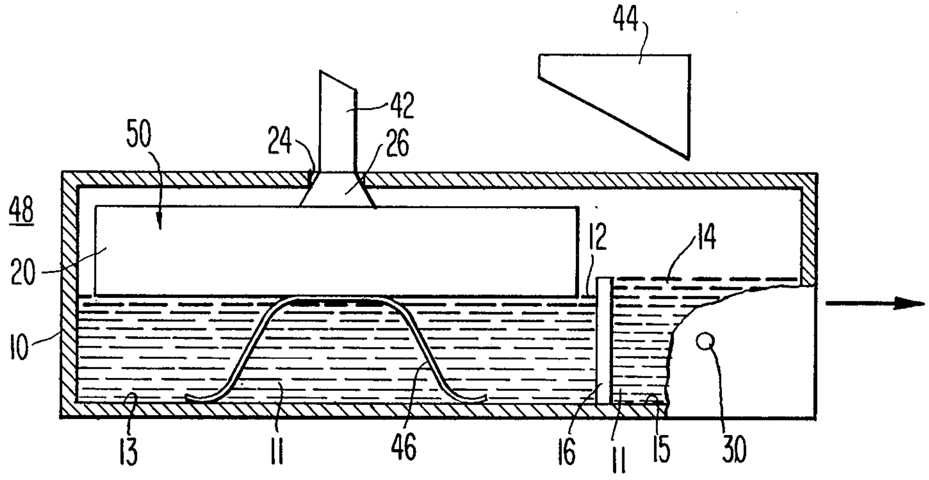
FIG. 4 is a front pictorial view of an alternate embodiment of the disposable ink jet cartridge with a section cut away.
Figure 5:
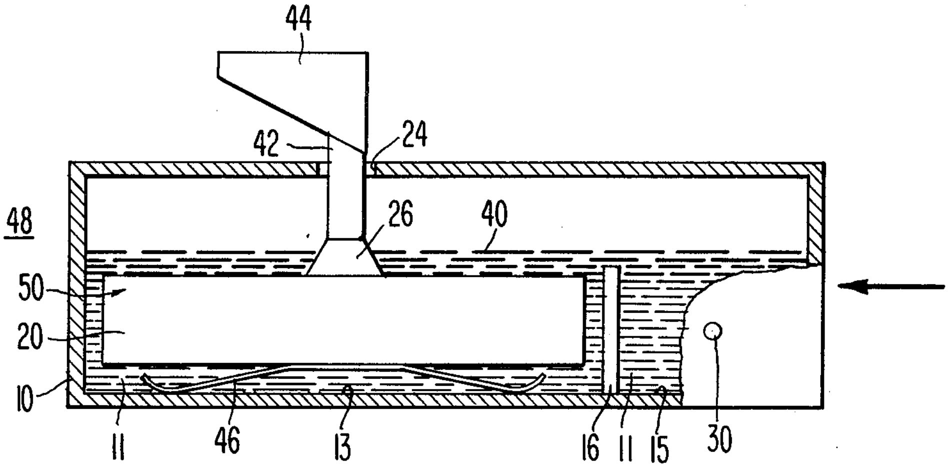
FIG. 5 is similar to FIG. 4, but shows the cartridge after the printer head has moved to the right, thereby activating the cartridge's priming mechanism.

FIGS. 4 and 5 illustrate an alternate embodiment of the present invention. The alternate embodiment performs the same functions as the primary embodiment, but utilizes different elements to depress the float member 50. In the alternate embodiment, cam 44 interacts directly with rod 42 rather than transmitting the downward force through a leaf spring. Note that the top of rod 42 is angled to interact with the bottom surface of cam 44.

In the alternate embodiment, as the head (and included cartridge 48) moves right and rod 42 engages cam 44, the float member 50 is pushed down, the downward force compressing bow-shaped spring 46 (FIG. 5). The downward movement of float shell 20 displaces the ink 11 in the first portion 13 of the reservoir 10, thereby raising the ink 11 in the reservoir 10 to the third level 40. As the printer mechanism moves the head (and included cartridge 48) left, the cam 44 disengages the downward force on rod 42, and bow spring 46 restores the float member 50 to the position shown in FIG. 4. As a result, the ink 11 in the second portion 15 of reservoir 10 is restored to the second level 11, thereby restoring optimum head pressure on nozzle 30. Further, as in the primary embodiment, the automatic venting action has allowed air to replace the volume of ink dispensed between priming operations.

Having shown and described the preferred embodiments of the present invention, those skilled in the art will realize that various omissions, substitutions and changes may be made without departing from the spirit of the invention.

Thus, those skilled in the art will appreciate that it may be desirable to prime the cartridge 34,48 after each line is printed. In such case, each time the print head mechanism (and included cartridge 34, 48) moves to the right, it would move a sufficient distance to engage cam 32, 44 with rod 22, 42 respectively.

Further, those skilled in the art will appreciate that the cartridge 34,48 must be replaced when the supply of ink 11 in the first portion 13 of the cartridge 34, 48 reaches a point when it is no longer sufficient to raise the ink 11 in the second portion 15 of the cartridge 34, 48 above the wall 16 when the float member 18, 50 is depressed.

It is the intention therefore, that the invention only be limited as indicated by the scope of the following claims.

What is claimed is:

1. An ink jet cartridge forming part of a head of a printer mechanism, said head mounted to move transversely back and forth across the width of a recording paper, said ink jet cartridge comprising:

reservoir means for containing an ink supply, said reservoir means divided into first and second compartments;

an ink jet nozzle means mounted to said second compartment;

priming/venting means, movably mounted in said first compartment, for raising the ink level in said second compartment and venting said reservoir means; and external cam means, mounted on said printer mechanism, said cam means for actuating said priming/venting means as said head moves toward one end of the width of said recording paper.

2. The ink jet cartridge in accordance with claim 1 wherein said priming/venting means includes:

float means, contained in said first compartment, said float means for displacing the ink in said first compartment;

rod means, connected to said float means, said rod means for transferring a downward force to said float means; and leaf spring means, connected between said rod means and said reservoir means, said leaf spring means activated by said cam means for depressing said float means to a depressed position, said leaf spring means further for raising said float means from said depressed position.

3. The ink jet cartridge in accordance with claim 1 wherein said primary/venting means includes:

float means, contained in said first compartment; said float means for displacing the ink in said first compartment, rod means, connected to said float means, said rod means for transferring a downward force to said float means; and bow spring means, contained in said first compartment below said float means, said bow spring means for exerting an upward force on said float means in response to the application of said downward force to said float means.

4. The ink jet cartridge in accordance with claim 2 or 3 wherein said rod means passes through a hole in said reservoir means.

5. The ink jet printer cartridge in accordance with claim 4 wherein said priming/venting means further includes washer means, connected to said rod means, said washer means for sealing said hole when said float means is in a raised position.

6. The ink jet printer cartridge in accordance with claim 1 wherein said first and second compartments are formed by a vertical wall extending between the side walls of said reservoir means.

7. The ink jet cartridge in accordance with claim 5 wherein the height of said wall is chosen to provide an optimum head pressure to said ink jet nozzle means when the height of the ink in said second compartment is at the same height as the top of said wall.

8. The ink jet cartridge in accordance with claim 1 wherein said ink jet nozzle means is mounted on one of the sidewalls of said reservoir means, the orifice of said ink jet nozzle means interfacing with a hole passing through the sidewall on which said ink jet nozzle means is mounted.

9. The ink jet cartridge in accordance with claim 2 wherein said cam means is fixedly mounted to said printer mechanism in horizontal alignment with said leaf spring means such that said cam means slidably engages and depresses the end of said leaf spring means connected to said rod means as said head moves transversely across said recording paper in one direction.

10. The ink jet cartridge in accordance with claim 1 wherein said ink jet cartridge is a disposable unit which may be replaced by operator.

11. The ink jet cartridge in accordance with claim 5 wherein said washer means is a washer formed of a pliable material, said washer mounted on said rod means, said washer shaped to seal the hole in said reservoir when said float means is in a raised position.

12. The ink jet cartridge in accordance with claim 5 wherein said washer means only partially seals said hole when said float means is in the raised position, whereby said reservoir means is at least partially vented at all times.

13. The ink jet cartridge in accordance with claim 3 wherein said cam means is fixedly mounted to said printer mechanism in horizontal alignment with said rod means such that said cam means slidably engages and depresses said rod means as said head moves transversely across said recording paper in one direction.

14. The ink jet cartridge in accordance with claim 1 wherein said cartridge operates in an electrostatic, on-demand mode.

15. The ink jet cartridge in accordance with claim 1 wherein said cam means mechanically engages said priming/venting means as said head moves towards said one end of the width of said recording paper.

16. An ink jet cartridge forming part of a head of a printer mechanism, said head mounted to move transversely back and forth across the width of a recording paper, said ink jet cartridge comprising:

reservoir means for containing an ink supply, said reservoir means divided into first and second compartments;

an ink jet nozzle means mounted to said second compartment;

priming means, movably mounted in the first compartment, for raising the ink level in said second compartment; and external cam means, mounted on said printer mechanism, for mechanically actuating said priming means as said head moves toward one end of the width of said recording paper.

17. The ink jet cartridge in accordance with claim 16 wherein said priming means includes means for venting said reservoir means.

18. The ink jet cartridge in accordance with claim 16 or 17 wherein said priming means includes:

float means, contained in said first compartment, said float means for displacing the ink in said first compartment;

rod means, connected to said float means, said rod means for transferring a downward force to said float means; and leaf spring means, connected between said rod means and said reservoir means, said leaf spring means actuated by said cam means for depressing said float means to a depressed position, said leaf spring means further for raising said float means from said depressed position.

19. The ink jet cartridge in accordance with claim 16 or 17 wherein said priming means includes:

float means, contained in said first compartment, said float means for displacing the ink in said first compartment;

rod means, connected to said float means, said rod means for transferring a downward force to said float means; and bow spring means, contained in said first compartment below said float means, said bow spring means for exerting an upward force on said float means in response to the application of said downward force to said float means.

* * * * *